US008935313B2

(12) United States Patent
Sherer et al.

(10) Patent No.: US 8,935,313 B2
(45) Date of Patent: Jan. 13, 2015

(54) QUICK SESSION SETUP FOR VIDEO ON DEMAND WITH INFORMATION CACHING

(75) Inventors: W. Paul Sherer, Danville, CA (US); Kirk Blattman, San Ramon, CA (US); Danny M. Nessett, Fremont, CA (US); David Yates, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1817 days.

(21) Appl. No.: 11/361,302

(22) Filed: Feb. 23, 2006

(65) Prior Publication Data

US 2006/0200558 A1    Sep. 7, 2006

Related U.S. Application Data

(60) Provisional application No. 60/655,328, filed on Feb. 23, 2005.

(51) Int. Cl.
| | |
|---|---|
| G06F 15/16 | (2006.01) |
| H04N 7/173 | (2011.01) |
| H04L 12/18 | (2006.01) |
| H04L 29/06 | (2006.01) |
| H04N 21/238 | (2011.01) |

(Continued)

(52) U.S. Cl.
CPC ...... *H04L 12/1881* (2013.01); *H04L 29/06027* (2013.01); *H04N 21/238* (2013.01); *H04N 21/262* (2013.01); *H04N 21/6377* (2013.01); *H04N 21/6408* (2013.01); *H04N 21/658* (2013.01); *H04L 65/1043* (2013.01); *H04L 65/605* (2013.01); *H04L 65/4084* (2013.01); *H04L 65/4092* (2013.01); *H04L 65/80* (2013.01); *H04L 67/14* (2013.01); *H04L 67/145* (2013.01); *H04L 67/142* (2013.01); *H04L 63/10* (2013.01)
USPC .............................. 709/202; 709/229; 725/87

(58) Field of Classification Search
CPC ............ H04N 7/17318; H04N 21/482; H04N 21/6587; H04N 21/47202
USPC ......................................................... 709/202
See application file for complete search history.

(56) References Cited

U.S. PATENT DOCUMENTS

| | | | | |
|---|---|---|---|---|
| 5,630,119 | A | * | 5/1997 | Aristides et al. ...................... 1/1 |
| 6,973,037 | B1 | | 12/2005 | Kahveci |

(Continued)

OTHER PUBLICATIONS

U.S. Office Action dated Dec. 24, 2008 cited in U.S. Appl. No. 11/361,301, 13 pgs.

(Continued)

*Primary Examiner* — Rupal Dharia
*Assistant Examiner* — Joe Chacko
(74) *Attorney, Agent, or Firm* — Merchant & Gould

(57) ABSTRACT

A technique for managing session setup for video on demand sessions involves caching information related to session setup for a session manager and then utilizing the cached information to setup a video on demand session for a client in response to a session setup request that is received from the client. Because information related to session setup is cached for the session manager, the session manager can utilize the information to establish a session without having to exchange messages with other video on demand elements, in particular other servers in the video on demand network. Reducing or eliminating the number of messages exchanged between video on demand elements enables video on demand sessions to be quickly and efficiently setup.

23 Claims, 6 Drawing Sheets

(51) Int. Cl.
*H04N 21/262* (2011.01)
*H04N 21/6377* (2011.01)
*H04N 21/6408* (2011.01)
*H04N 21/658* (2011.01)
*H04L 29/08* (2006.01)

(56) References Cited

U.S. PATENT DOCUMENTS

| | | | | |
|---|---|---|---|---|
| 6,973,667 | B2* | 12/2005 | Fritsch | 725/88 |
| 7,010,801 | B1* | 3/2006 | Jerding et al. | 725/95 |
| 7,032,176 | B2* | 4/2006 | Gordon et al. | 715/719 |
| 7,107,606 | B2* | 9/2006 | Lee | 725/87 |
| 2002/0042921 | A1* | 4/2002 | Ellis | 725/87 |
| 2003/0028889 | A1* | 2/2003 | McCoskey et al. | 725/91 |
| 2003/0088876 | A1* | 5/2003 | Mao et al. | 725/91 |
| 2003/0200548 | A1* | 10/2003 | Baran et al. | 725/90 |
| 2003/0208763 | A1* | 11/2003 | McElhatten et al. | 725/58 |
| 2004/0226044 | A1 | 11/2004 | Goode | |
| 2005/0086501 | A1* | 4/2005 | Woo et al. | 713/189 |
| 2005/0210138 | A1 | 9/2005 | Zigmond et al. | |
| 2005/0216933 | A1* | 9/2005 | Black | 725/34 |
| 2006/0047845 | A1* | 3/2006 | Whited et al. | 709/231 |
| 2006/0200578 | A1 | 9/2006 | Sherer et al. | |

OTHER PUBLICATIONS

U.S. Office Action dated Jun. 17, 2009 cited in U.S. Appl. No. 11/361,301, 17 pgs.
U.S. Final Office Action dated Dec. 23, 2009 cited in U.S. Appl. No. 11/361,301, 17 pgs.
U.S. Office Action dated Mar. 10, 2010 cited in U.S. Appl. No. 11/361,301, 13 pgs.
U.S. Final Office Action dated Aug. 26, 2010 cited in U.S. Appl. No. 11/361,301, 19 pgs.

* cited by examiner

QUICK SESSION SETUP FOR VIDEO ON DEMAND WITH INFORMATION CACHING

CROSS-REFERENCE TO RELATED APPLICATION

This application is entitled to the benefit of provisional U.S. Patent Application Ser. No. 60/655,328, filed Feb. 23, 2005, the disclosure of which is incorporated by reference herein in its entirety.

This application is related to the co-filed application entitled "AVALANCHE CONTROL FOR VIDEO ON DEMAND SESSION SETUP" having application Ser. No. 11/361,301, filed Feb. 23, 2006.

FIELD OF THE INVENTION

The invention relates generally to interactive video services via digital video networks, and more particularly to systems and methods for establishing video on demand sessions.

BACKGROUND OF THE INVENTION

Providers of television-based entertainment are attempting to expand the range of services that they offer to subscribers in order to increase revenues. In addition to television content such as that found on conventional cable networks, some providers also offer interactive video services, such as video on demand (VOD). The provision of interactive video services is stimulating the further development of digital network technology, which in turn will enable providers to increase the number and kinds of video services offered to subscribers.

VOD allows users to select and watch video content over a network as part of an interactive television experience. VOD systems may support "streaming," in which content is available to the subscriber while the video streams over the network, and/or "downloading," in which the content is downloaded to a subscriber device, such as a set-top box, before the content is available to the subscriber.

In general, streaming systems need greater network bandwidth and thus more network resources. It is possible to provide streaming VOD services over a wide area network (WAN) to service a fairly large community or geographic area, however, the responsiveness to the subscriber may be reduced to unacceptable levels. For example, the establishment of a VOD session using conventional techniques typically requires 20 or more messages between VOD elements, once a subscriber signals his/her intention to establish a video on demand session. This in turn can induce session setup delays of a second or more. For certain VOD applications, such as network personal video recorder (NPVR), this delay is unacceptable.

In light of the above, what is needed is a system and method for the rapid establishment of a VOD session requested by a subscriber.

SUMMARY OF THE INVENTION

A technique for managing session setup for video on demand sessions involves caching information related to session setup for a session manager and then utilizing the cached information to setup a video on demand session for a client in response to a session setup request that is received from the client. Because information related to session setup is cached for the session manager, the session manager can utilize the information to establish a session without having to exchange messages with other video on demand elements, in particular other servers in the video on demand network. Reducing or eliminating the number of messages exchanged between video on demand elements enables video on demand sessions to be quickly and efficiently setup.

Other aspects and advantages of the invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

In accordance with the invention, systems and methods that may be used to quickly setup a video on demand (VOD) session requested by a client are provided. As a non-limiting example, the VOD session requested by the client may be a network personal video recorder (NPVR) session. In an embodiment of the invention, a VOD session may be rapidly set up, typically within a time period of less than 1 second, in response to a client request. The request may be initiated by subscriber input to a client device. According to one aspect of the invention, and in contrast to the prior art, the request from the client for session setup is received directly by a session manager, and the session manager caches information related to session setup. This differs from conventional session setup techniques, in which requests for VOD session setup are processed by messaging between different servers in the video on demand system to complete a session setup.

The term "video" as used herein may optionally include audio and/or associated content control information. The term "content" as used herein may be used to refer to digital video content, which may be delivered to a client over a network. A "network" for distributing digital video content may include a packet-based distribution network, wherein the packet-based distribution network may utilize, for example, IP, Ethernet, ATM, or a combination thereof to communicate the digital video content to the client. A "network" for distributing digital video content may also include a hybrid fiber coaxial (HFC) network, as is well known in the field of cable television distribution.

Figure 1:
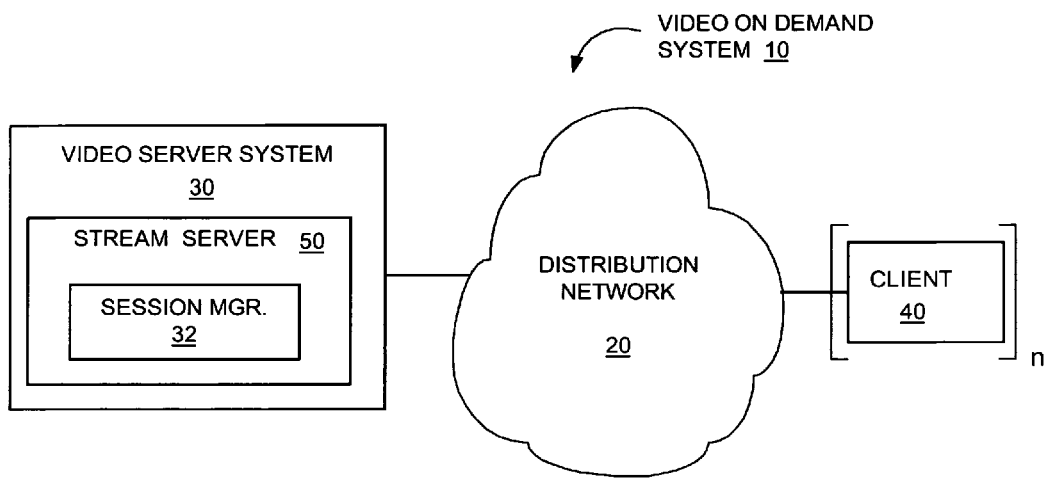
FIG. 1 is a schematic representation of an exemplary video on demand system architecture, according to one aspect of the invention.

FIG. 1 is a schematic representation of an exemplary video on demand system architecture 10, according to one aspect of the invention. The video on demand system may include a distribution network 20 that is capable of both broadcast/multicast and video on demand communications. The distribution network may be implemented with multiple network elements (not separately shown in FIG. 1) for facilitating broadcast/multicast and video on demand communications, as is well known in the art.

As illustrated in FIG. 1, a video server system 30 may be coupled to the distribution network 20. The video server system may provide digital video content to multiple clients 40 utilizing a broadcast/multicast scheme over the distribution network. Further, each of the clients may be capable of receiving digital video content for multiple channels from the video server system. Each of the channels may be identified by a corresponding channel number.

In the embodiment of FIG. 1, the video server system 30 includes a stream server 50 for streaming data streams to clients 40 during broadcast/multicast or a VOD session. The video server system also includes a session manager 32 for managing set up of a VOD session. Typically, the session manager is integrated with, or internal to, the stream server. In other embodiments, the session manager may be a separate component (i.e., a separate server). The session manager is configured to provide for quick session setup of a VOD session in response to a session setup request from the client, as is described in more detail hereinbelow.

Figure 2:
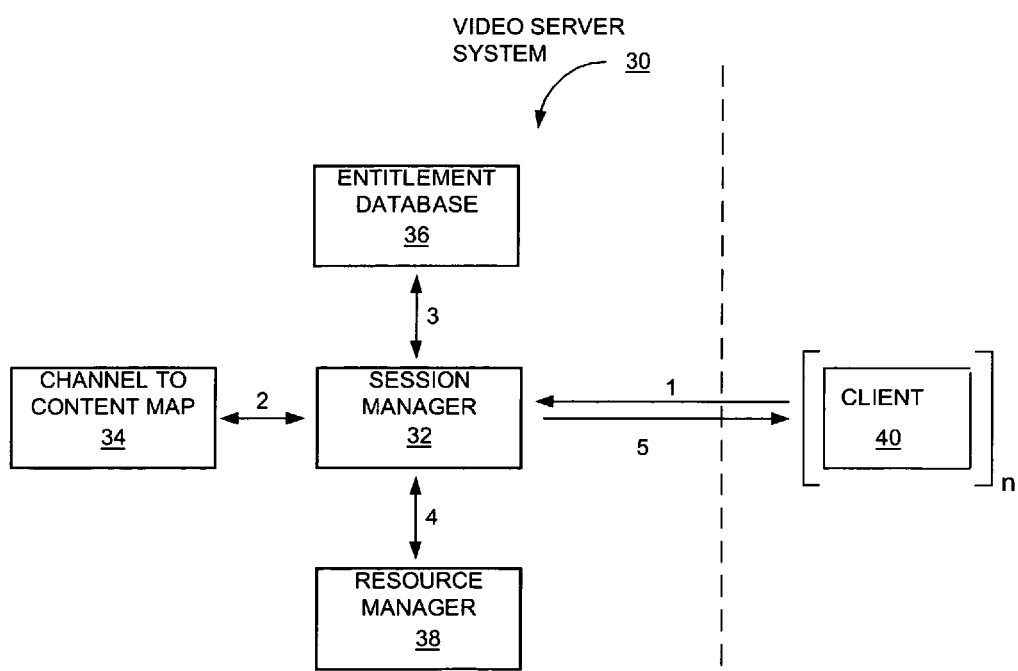
FIG. 2 is a schematic representation of an exemplary video server system for quick session setup of a video on demand session, according to the invention.

FIG. 2 is a schematic representation of an exemplary video server system 30 configured to implement quick session setup for a video on demand session, according to one aspect of the invention. The video server system includes a session manager 32, a channel to content map 34, an entitlement database 36, and a resource manager 38. The session manager manages transactions involved in session setup. The video on demand session may involve, for example, a NPVR session.

The transactions involved in session setup begin when a session setup request is sent from the client 40 and received by the session manager 32. In an embodiment, the session setup request includes a channel number, which has been inserted into the session setup request by the client. The transactions involved in session setup are described fully hereinbelow, e.g., with reference to FIGS. 2 and 6.

The channel to content map 34 is in signal communication with the session manager 32. The channel to content map includes a real-time database of associations between the channel numbers and content identifiers, wherein the channel to content map associates each channel number with a different content identifier, and the content identifiers identify video content related to a requested VOD session. In an embodiment, the channel to content map includes content identifier to content source information that indicates the location of the source of the content identified by the content identifier. The source of the content may be, for example, a point within the video server system at which content is ingested into the video server system or a server within the video server system at which the content is stored. Although the channel to content map is shown in FIG. 2 as being separate from the session manager, in an embodiment, the channel to content map may be integrated with the session manager (see, e.g., FIG. 4), with the stream server 50 (FIG. 1), or with other components of VOD infrastructure. Each of these configurations for the channel to content map is within the scope of the invention. In an embodiment, the channel to content map is located on a server that is remote to the server on which the session manager is located. In this case, the session manager communicates with the channel to content map utilizing a network messaging protocol.

With further reference to FIG. 2, the entitlement database 36 is in signal communication with the session manager 32; and the entitlement database includes a database of entitlement information that is used to authorize entitlement of a particular client 40 to access the video content related to a requested VOD session. Typically, the entitlement database may be external to the session manager; for example, the entitlement database may be implemented on a separate or remote server. When the entitlement database is located on a separate server or remote server, the session manager communicates with the entitlement database utilizing a network messaging protocol. Alternatively, the entitlement database may be implemented locally within the session manager (see, e.g., FIG. 4).

The resource manager 38 is in signal communication with the session manager 32, and includes resource reservation information, for a requested VOD session, which is provided to the session manager. The resource reservation information may be related to reservation, or pre-reservation, of network resources (see, for example, FIG. 6, steps 216a, and 216b, respectively). In an embodiment, the resource manager is located on a server that is remote to the server on which the session manager is located. In this case, the session manager communicates with the resource manager utilizing a network messaging protocol.

It is to be understood that, as used herein in the content of network resources, the terms "reservation" and "reserving" refer to the retention or retaining of network resources for a single VOD session, and in particular, where the session manager 32 contacts the resource manager 38 separately for each session setup request received by the session manager. As used herein in the context of network resources, the terms "pre-reservation" and "pre-reserving" refer to the retention or retaining of network resources for one or more subsequent VOD sessions, wherein the session manager does not need to contact the resource manager separately for each session setup request received by the session manager.

It is to be further understood that, as used herein in the context of network resources, the terms "retention" and "retaining" may be used to refer generically to include both the "pre-reservation" and "reservation" of network resources, as defined hereinabove, for one or more VOD sessions. The phrase "resource reservation information" may be used herein to refer generically to information associated with either the "pre-reservation" or "reservation" of network resources. Similarly, the phrase "resource reservation request" as used herein refers generically to a request for "resource reservation information" associated with either the "pre-reservation" or "reservation" of network resources.

Typically, the resource manager 38 function may be implemented in components other than the session manager 32. However, in an embodiment of the invention, the resource manager function may be implemented internally within the session manager (see, e.g., FIG. 4). The session manager is still further in communication with the client 40. The stream server 50 (see, FIG. 1) is omitted from FIG. 2 for the sake of clarity.

Transactions between the session manager 32 and each of the client 40, the channel to content map 34, the entitlement database 36, and the resource manager 38, which are involved in quick (VOD) session setup according to the invention, will now be described with further reference to FIG. 2. A subscriber to digital video content provided by the VOD system architecture 10 (FIG. 1) may instruct the client 40 to establish a VOD session by sending a session setup request to the session manager, whereby the session manager receives the session setup request directly from the client, as indicated by transaction 1. As an example, a subscriber may instruct the client 40 to establish the VOD session via a client component, such as a set-top box (not shown).

Although only a single session manager 32 is shown in FIG. 2, it is to be understood that the video server system 30 may comprise a plurality of session managers. In an embodiment of the invention, the session setup request may be unicast to a specific session manager for processing of the session setup request. In an alternative embodiment, the session setup request may be broadcast/multicast to a plurality of the session managers, one of which accepts the session setup request for processing.

In an embodiment, each VOD session is associated with broadcast/multicast digital video content that the client 40 receives on one of a plurality of broadcast/multicast channels, wherein each of the plurality of broadcast/multicast channels is identified by a channel number. The session setup request received by the session manager 32 includes the channel number.

After the session manager 32 receives the session setup request from the client 40, the session manager accesses the channel to content map 34 in transaction 2 of FIG. 2. As described hereinabove, the channel to content map comprises a real-time database of associations between channel numbers and content identifiers, wherein the content identifiers identify content related to the requested VOD session. The session manager consults the channel to content map, which translates the channel number in the session setup request into a content identifier, wherein the content identifier identifies the underlying content being broadcast/multicast on that channel number.

With further reference to FIG. 2, transaction 2 may take one of a plurality of different forms, according to various embodiments of the invention. As an example only, and not to limit the invention in any way, transaction 2 may be executed each time the session manager 32 receives a quick session setup request. In an embodiment, transaction 2 involves an exchange of messages between the channel to content map and the session manager. In an alternative embodiment of the invention, the session manager may cache channel to content map information. In the latter situation, transaction 2 may represent protocol messaging activity that implements a channel to content map cache coherency algorithm. The channel to content map cache coherency algorithm manages the transfer of information between the channel to content map 34 and the session manager, wherein the channel to content map may be remote from the session manager. Caching of channel to content map information for the purpose of quick session setup of a VOD session according to an aspect of the invention, is described fully hereinbelow (see, for example, FIG. 3 and FIG. 7).

Once the session manager 32 translates the channel number of the session setup request into a content identifier, the session manager sends an entitlement request to the entitlement database 36 to determine whether the client 40 is authorized to access the content identified by the content identifier, as indicated by transaction 3. As a non-limiting example, transaction 3 may include authorizing the client's entitlement to execute various NPVR functions on the content identified by the content identifier. Such NPVR functions may include, for example, pause, fast forward, slow forward, fast/slow rewind, and jump to frame.

The entitlement request from the session manager 32 to the entitlement database 36 may include the channel number, the content identifier, or both the channel number and the content identifier, since entitlement decisions authorizing the client 40 to access the identified content may depend on either one or both of the channel number and the content identifier.

With further reference to FIG. 2, transaction 3 may take one of a plurality of different forms, according to various embodiments of the invention. As an example only, and not to limit the invention in any way, transaction 3 may require the session manager 32 to send an entitlement request message to the entitlement database 36 on each occasion that the session manager receives a quick session setup request. In an alternative embodiment of the invention, the session manager may cache entitlement information. In the latter situation, transaction 3 represents the protocol messaging activity that implements an entitlement cache coherency algorithm for caching entitlement information by the session manager. The entitlement cache coherency algorithm manages the transfer of information between the entitlement database and the session manager, wherein the entitlement database may be remote from the session manager. Caching of entitlement information for the purpose of quick session setup of a VOD session according to an aspect of the invention, is described fully hereinbelow (see, for example, FIG. 3 and FIG. 7).

If the client 40 is entitled to access the identified content for the requested VOD session, the session manager 32 may retain network resources managed by the session manager itself for the VOD session. Thereafter, via transaction 4 (FIG. 2), the session manager contacts the resource manager 38 to retain any additional network resources that may be required for the VOD session. As non-limiting examples, the resource manager may reserve or pre-reserve network bandwidth, modulation equipment resources, and a digital channel over which the content for the VOD session is transmitted. The resource manager function may typically be implemented externally to the session manager, i.e., in equipment other than the session manager. However, in a accordance with the invention, the resource manager function may be implemented by the session manager.

In embodiments wherein the resource manager 38 function is implemented externally to the session manager 32, the session manager may contact the resource manager to reserve network resources on each occasion that the session manger receives a quick session setup request. Alternatively, the session manager may pre-reserve network resources for one or more subsequent VOD sessions. In either situation, the session manager exchanges messages with the resource manager (transaction 4) for retention (i.e., reservation or pre-reservation) of network resources for the VOD session.

Differences in the execution of transaction 4 for the two situations described above are as follows. When the session manager 32 contacts the resource manager 38 on separate occasions for each quick session setup request, transaction 4 represents a request for the resources required for a single VOD session. Whereas, when the session manager uses pre-reservation of network resources, transaction 4 represents the exchange of information necessary to pre-reserve resources for one or more subsequent VOD sessions.

Furthermore, in the case of pre-reservation of network resources, transaction 4 may further represent the exchange of information necessary to inform the resource manager 38 when each VOD session terminates. By informing the resource manager when each VOD session terminates, network resources may be re-allocated and used for other VOD sessions to be provided by the video server system 30.

With still further reference to FIG. 2, once the session manager 32 has retained all necessary network resources for the VOD session, the session manager assigns a video on demand session identifier (or "session identifier") to the data stream that will use the retained network resources, and the session manager returns the information related to session setup to the client 40 in transaction 5. Thereafter, the VOD session may be established.

Figure 3:
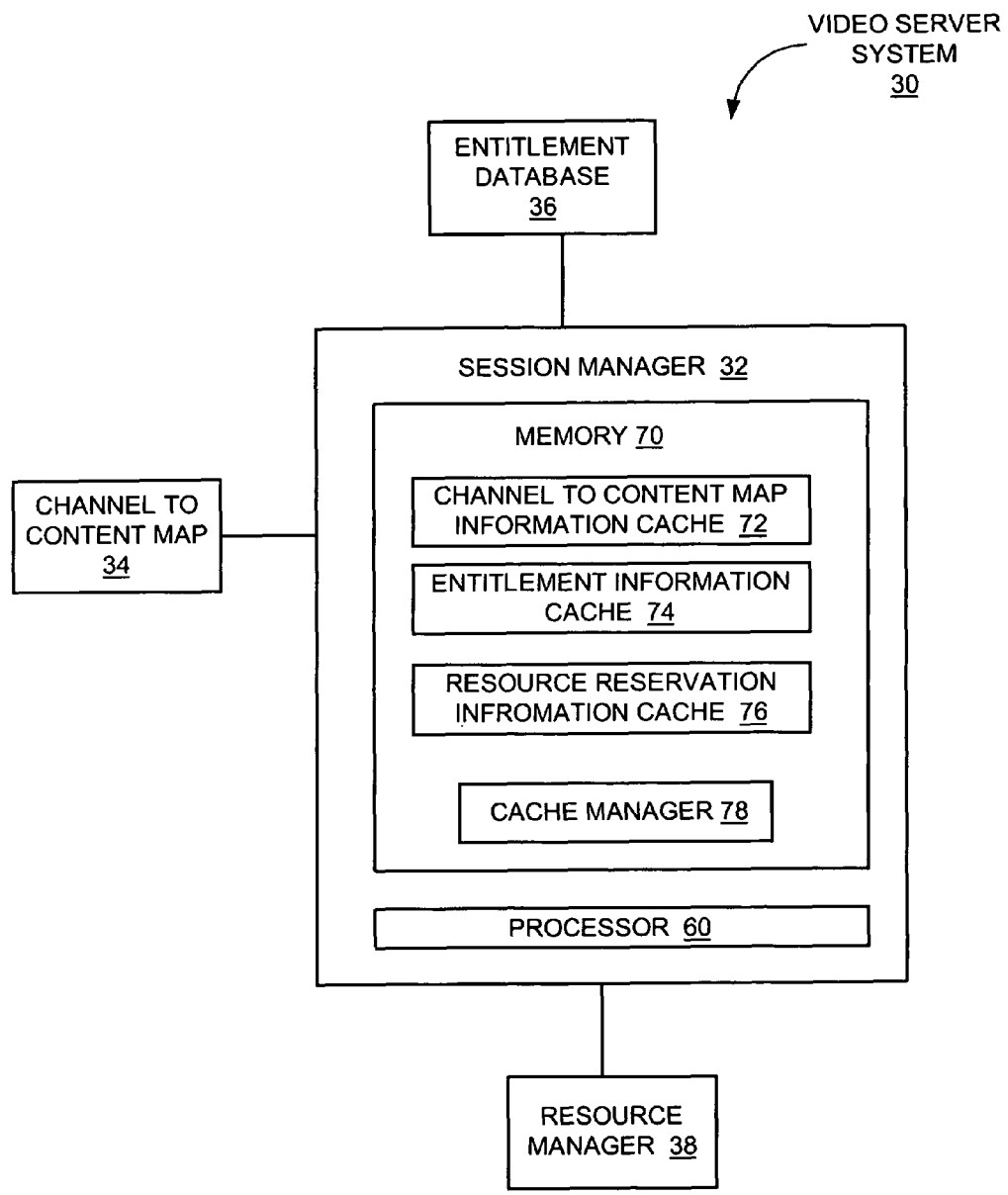
FIG. 3 is a block diagram of a video server system, having cached database and network resource information, for quick session setup of a video on demand session, according to an embodiment of the invention.

FIG. 3 is a block diagram showing an exemplary embodiment of a video server system 30 for quick session setup of a video on demand session, according to an embodiment of the invention. The video server system includes a session manager 32 in communication with each of the channel to content map 34, the entitlement database 36, and the resource manager 38, substantially as described with reference to FIG. 2. The session manager is further in communication with the client 40 for receiving a session setup request from the client. One or more of the channel to content map, the entitlement database, and the resource manager may be remote from, or external to, the session manager.

With further reference to FIG. 3, the session manager 32 further comprises a processor 60 and a memory 70. The memory may comprise cached information related to session setup by the session manager. For example, the memory may comprise one or more of the following: a channel to content map information cache 72, an entitlement information cache 74, and a resource reservation information cache 76. The channel to content map information cache, the entitlement information cache, and the resource reservation information cache may include cached channel to content map information, cached entitlement information, and cached resource reservation information, respectively. The session manager may further include a cache manager 78 for managing at least one of the channel to content map information cache, the entitlement information cache, and the resource reservation information cache. Although the session manager is described as caching certain information, other information related to session setup can be cached by the session manager.

Figure 6:
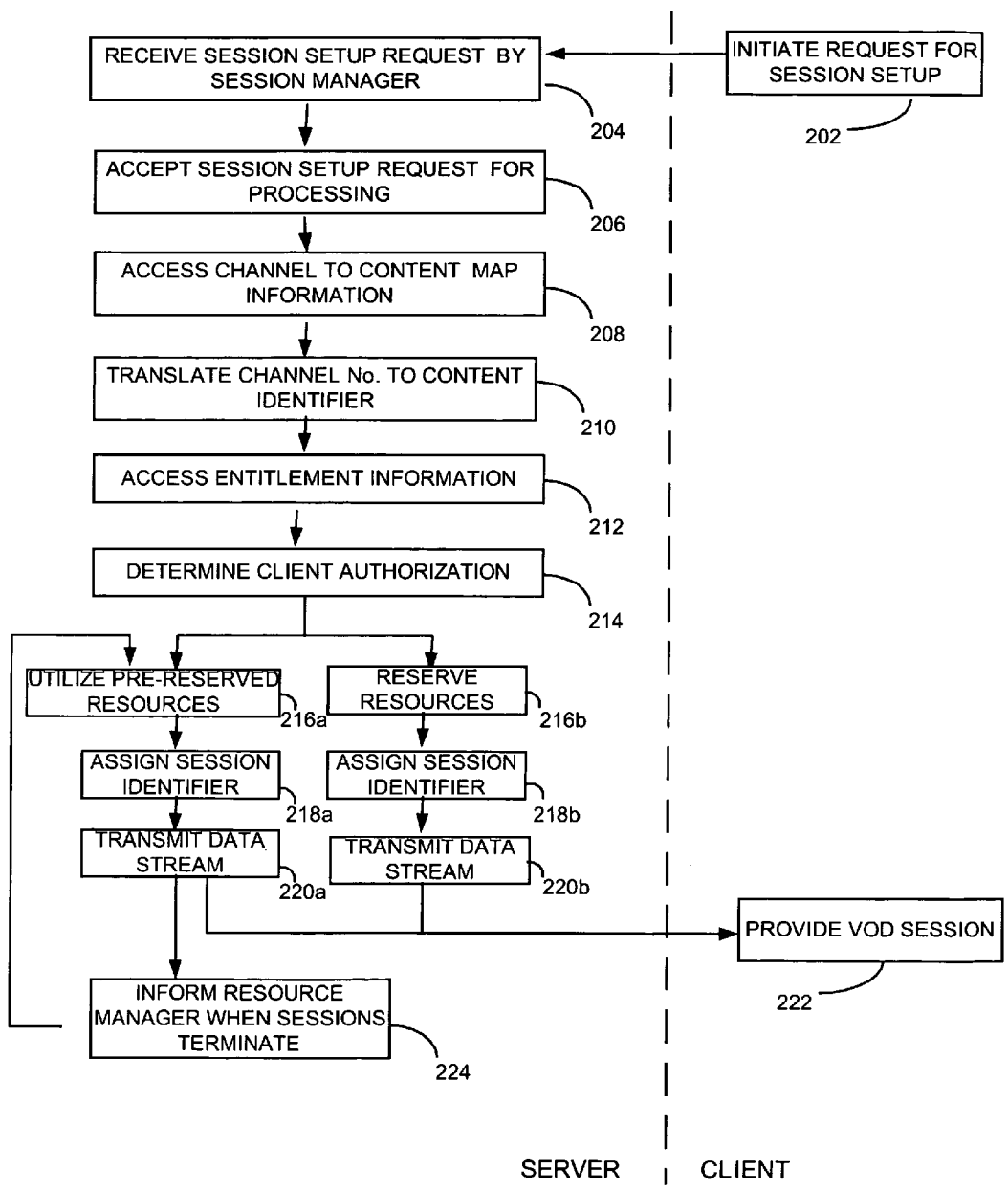
FIG. 6 is a flow diagram schematically representing an exemplary process for providing a video on demand session to a client, according to another embodiment of the invention.

Each of the cached channel to content map information, the cached entitlement information, and the cached resource reservation information may be processed substantially as described elsewhere herein, e.g., with reference to FIG. 2 and FIG. 6. However, in the embodiment depicted in FIG. 3, the channel to content map information, the entitlement information, and cached resource reservation information held in cache may be accessed more rapidly, thereby decreasing the time required by the session manager 32 to set up a VOD session. According to one aspect of the invention, the time required by the session manager to set up a VOD session may be less than 1 second.

Figure 4:
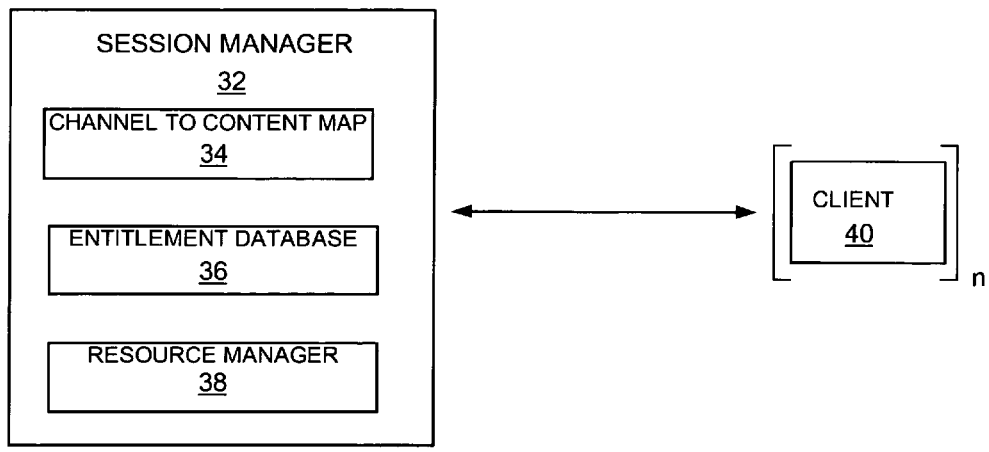
FIG. 4 is a block diagram showing a session manager for quick session setup of a video on demand session, the session manager having internal database and resource manager functionality, according to another embodiment of the invention.

FIG. 4 is a block diagram showing a session manager 32 for quick session setup of a video on demand session, according to another embodiment of the invention. The session manager comprises a channel to content map 34, an entitlement database 36, and a resource manager 38, wherein each of the channel to content map, the entitlement database, and the resource manager are integrated with, or reside within, the session manager. The functionality of the session manager, the channel to content map, the entitlement database, and the resource manager in the embodiment of FIG. 4 may be substantially as described hereinabove, e.g., with respect to FIG. 2. The session manager is shown in relation to clients 40, while the distribution network 20 is omitted from FIG. 4 for the sake of clarity.

Various configurations intermediate between those shown in FIGS. 2 and 4 are also contemplated under the invention. As non-limiting examples, a video server system 30 according to one exemplary embodiment of the invention may comprise: 1) a session manager 32 having an internal channel to content map 34, a remote entitlement database 36, and an internal resource manager 38; or 2) a session manager having a remote channel to content map, an internal entitlement database, and an internal resource manager. Other configurations for the video server system and session manager are also within the scope of the invention, as may be apparent to the skilled artisan.

Figure 5:
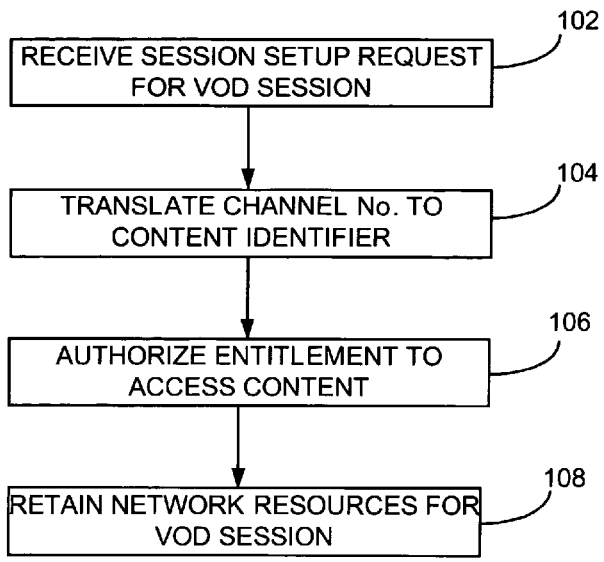
FIG. 5 is a flow diagram schematically representing steps involved in an exemplary method for setting up a video on demand session, according to another embodiment of the invention.

FIG. 5 is a flow diagram schematically representing steps involved in an exemplary method for setting up a video on demand session requested by a client, according to another embodiment of the invention. At block 102, a quick session setup request for establishing a VOD session is sent from the client 40, wherein the session setup request may be received by the session manager 32. According to one aspect of the invention, and in contrast to the prior art, the quick session setup request received by the session manager is received directly from the client. As noted hereinabove, the session setup request received by the session manager includes a channel number associated with the VOD session, wherein the channel number associated with the VOD session is inserted in the quick session setup request by the client.

At block 104 (FIG. 5) the channel number is translated into a content identifier. The content identifier identifies content related to the VOD session, as described hereinabove (e.g., with respect to FIG. 2). Translation of the channel number into the content identifier may be implemented by the channel to content map 34 (see, e.g., FIGS. 2-4). Thereafter, at block 106 the client's 40 entitlement to access the content identified by the content identifier may be authorized. Authorization of the client's entitlement to access the identified content may be executed by the entitlement database 36, for example, as described hereinabove with respect to transaction 3 of FIG. 2. At block 108, network resources for the VOD session may be retained for the VOD session. Retention of the network resources for the VOD session may be implemented by the resource manager 38, substantially as described hereinabove (see, e.g., FIGS. 2-4).

According to one aspect of the invention, all of the tasks described with reference to blocks 102-108 of FIG. 5 may be completed within a time period of less than one second. Thus, this technique enables setting up a VOD session with only a sub-second delay once a subscriber initiates a session setup request via the client 40.

FIG. 6 is a flow diagram schematically representing tasks involved in an exemplary process for providing a video on demand session to a client, according to another embodiment of the invention. At block 202 a session setup request may be initiated by a client 40, e.g., via a client device, such as a set-top box (STB). The session setup request includes a channel number inserted by the client. At block 204 the session setup request is received by at least one session manager 32. At block 206 the session setup request is accepted for processing by one of the session managers. At block 208 the session manager 32 accesses channel to content map information via the channel to content map 34. The channel to content map comprises a real-time database which associates each of a plurality of the channel numbers with a different content identifier. In an embodiment, the channel to content map information, or a portion thereof, may reside within the session manager, e.g., as cached channel to content map information. At block 210 the channel number in the session setup request is translated into a content identifier.

At block 212 the session manager 32 accesses entitlement information. Accessing the entitlement information may comprise sending an authorization request, via the session manager, to the entitlement database 38, wherein the authorization request comprises at least one of the channel number and the content identifier. In an embodiment, accessing the entitlement information may comprise sending the authorization request to the entitlement database in response to each of a plurality of the session setup requests received by the session manager. In an embodiment, the entitlement information, or a portion thereof, may reside within the session manager, e.g., as cached entitlement information.

At block 214 the client's 40 authorization to access identified content for the VOD session is determined. Determination of the client's authorization to access the identified content may be based on the channel number, the content identifier, or both the channel number and the content identifier.

At blocks 216a/216b the session setup procedure may diverge according to how the resource manager 32 manages the network resources required for providing the VOD session to the client 40. At block 216a the network resources for providing the VOD session to the client have been pre-reserved for one or more subsequent VOD sessions and the pre-reserved resources are utilized in the session setup process. At block 216b, in contrast, the network resources for providing the VOD session to the client are reserved separately for each VOD session. As described hereinabove with reference to FIG. 2, when the network resources for providing the VOD session to the client are reserved separately for each VOD session, the session manager contacts the resource manager 38 on each occasion that the session manager receives a session setup request from a client.

Blocks 218a/220a and 218b/220b of the process of FIG. 6 involve similar steps, wherein at blocks 218a/218b a VOD session identifier is assigned to a data stream for the VOD session; and at blocks 220a/220b the data stream is transmitted to the client 40 via the network resources pre-reserved or reserved, at block 216a or block 216b, respectively. At block 222 the VOD session is provided to the client 40. Thereafter, in the case of the "a" branch of the flow diagram of FIG. 6, the resource manager 38 is informed by the session manager 32 when each VOD session is terminated (block 224). By informing the resource manager when each VOD session terminates, network resources may be re-allocated to subsequent VOD sessions.

To minimize the delay in setting up VOD sessions, the session manager 32 may cache resources or information managed by remote servers, such as those managing channel to content map 34, entitlement database 36, and resource manager 38 functionality. By implementing such resource and information caching, significant improvements in the efficiency and responsiveness of the session manager can be made when processing session setup requests.

Figure 7:
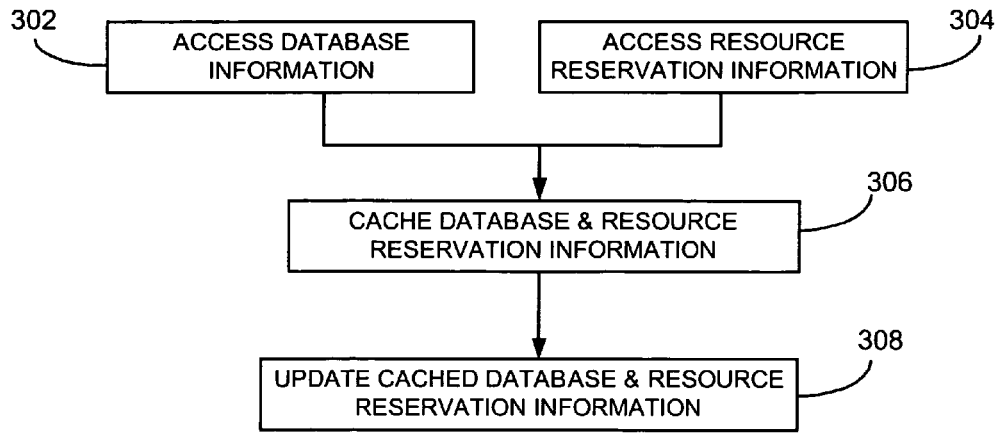
FIG. 7 is a flow diagram schematically representing steps involved in an exemplary method for caching database and network resource information for quick session setup of a video on demand session, according to another embodiment of the invention.

FIG. 7 is a flow diagram schematically representing tasks involved in an exemplary technique for caching database information and network resource information for quick session setup of a video on demand session, according to another embodiment of the invention. At block 302 database information is accessed. The database information may be accessed by the session manager 32 that has received a session setup request for the VOD session. The database information may include channel to content map information for translating a channel number within the session setup request to a content identifier. The channel to content map information may be accessed from a remote server (see, e.g., FIG. 3). The database information may additionally or alternatively include entitlement information for authorizing the client's 40 entitlement to access the content (e.g., digital video content) identified by the content identifier. The entitlement information may also be accessed from a remote server.

At block 304 resource reservation information is accessed. The resource reservation information may be accessed by the session manager 32 that has received, and accepted, a session setup request for a VOD session. The resource reservation information may be related to reservation, or pre-reservation, of network resources to be used in providing the VOD session. The network resources may be used for streaming the content to the client 40 during the VOD session. As an example, the reserved or pre-reserved network resources may include network bandwidth, modulation equipment resources, and a digital channel over which the content for the VOD session is transmitted.

At block 306 the channel to content map information, the entitlement database information, and the resource reservation information, may be cached by the session manager 32 to provide a channel to content map information cache 72, an entitlement information cache 74, and a resource reservation information cache 76. Caching channel to content map information may involve implementing a channel to content map cache coherency algorithm for managing transfer of channel to content map information from the channel to content map 34 to the session manager, and caching the channel to content map information by the session manager. Similarly, caching entitlement information may involve implementing a cache coherency algorithm for managing transfer of entitlement information from the entitlement database 36 to the session manager, and caching the entitlement information by the session manager. Each of the channel to content map information cache, the entitlement information cache, and the resource reservation information cache may reside within the memory 70 of the session manager (see, e.g., FIG. 3).

At block 308 the channel to content map information cache 72, the entitlement information cache 74, and the resource reservation information cache 76 may be updated. According to one aspect of the invention, cached information held by the session manager 32 may be updated independently of a session setup request for the VOD session. That is to say, updates to cached information may occur as the result of events not directly related to the receipt by the session manager of a quick session setup request. Additionally, although the session manager is described as caching certain information, other information related to session setup can be cached by the session manager.

Under the invention, updating the channel to content map information cache 72, the entitlement information cache 74, and the resource reservation information cache 76 may be accomplished via various mechanisms. For example, information related to session setup may comprise database information on a remote server, and updating information held in cache by the session manager 32 may comprise periodically uploading the entire database, or a portion of the database, to the session manager. As a non-limiting example, updating information held in cache by the session manager may comprise uploading a sub-set of the database to the session manager, wherein the sub-set of the database may be determined by a client service group of clients 40 previously serviced by the session manager in the establishment of VOD sessions.

According to another example, database information may be uploaded from a database of a remote server in response to a pre-determined percentage change of the database from a prior reference point. The prior reference point may comprise, as an example, a defined prior time point or condition. As an example, the pre-determined percentage change of the database may be measured with respect to the database content at the time of a prior upload event. Such a database may include, e.g., the channel to content map 34 or the entitlement database 36.

As a further example, the cached information may comprise resource reservation information in the session manager cache that is updated when a variable time interval has elapsed, for example, where the variable time interval is dependent on the availability of network resources. According to still another example, wherein the cached information may again include resource reservation information, updating the cached resource reservation information may result in re-allocating network resources between multiple session managers 32 on the basis of a network resource requirement of each of the session managers. In yet another example, updating information held in cache by the session manager may involve changing cached resource reservation information such that network resources that were previously retained for one or more VOD sessions are revoked when a quantity of available network resources falls below a configurable minimum threshold.

According to yet another aspect of the invention, updating information held in cache by the session manager 32 may occur according to whether a mismatch exists between information held at a remote server and that held in cache by the session manager. An exemplary technique for updating cached information related to session setup (e.g., channel to content map information, entitlement information, and resource reservation information) is described hereinbelow with reference to FIG. 8. Naturally, each of the above techniques or mechanisms for updating cached information related to VOD session setup is within the scope of the invention.

Various mechanisms or methods for triggering the update of cached information are also possible in accordance with the invention. As a non-limiting example, updating cached information related to session setup may be triggered when the session manager 32 first comes online. In another non-limiting example, updating of cached information related to session setup may be triggered after a constant time interval, or a variable time interval, has elapsed.

Figure 8:
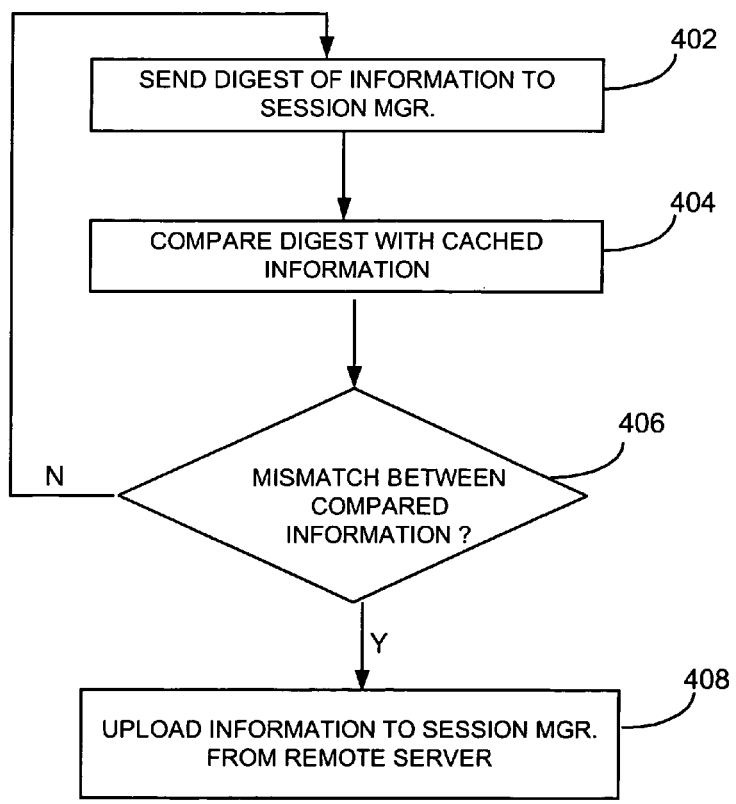
FIG. 8 is a flow diagram schematically representing steps involved in an exemplary method for updating cached database information for quick session setup of a video on demand session, according to another embodiment of the invention.

FIG. 8 is a flow diagram schematically representing steps involved in an exemplary technique for updating cached information related to session setup of a video on demand session, according to another embodiment of the invention. The information to be updated may include information related to session setup, such as channel to content map information, entitlement information, and resource reservation information. The cached information may be updated by uploading information to the session manager 32 from one or more remote servers, such as a channel to content map 34 database server, an entitlement database 36 server, or a resource manager 38 server, located remote from the session manager 32 (see, e.g., FIG. 2).

With further reference to FIG. 8, at block 402 a digest, or summary, of the information held by one or more of the remote servers may be uploaded from the remote server(s) to the session manager 32. For example, a remote server might compute a digest (e.g., an MD5 or SHA-1 hash) of its database, or a portion thereof, and send the digest to the session manager. At block 404 the digest received from the remote server may be used by the session manager to compare the information held by the remote server with the cached information held by the session manager. At decision block 406, if a mismatch exists between the compared information (Y), updated information may be uploaded from the remote server to the session manager (block 408), whereby the information cached by the session manager is reconstituted from the authoritative copy in the remote server. Conversely, if there is no mismatch between the compared information (N), the information is not uploaded from the remote server and flow may proceed back to block 402 for reiteration. Various mechanisms for updating and uploading cached information to the session manager are described hereinabove (e.g., with reference to FIG. 7).

Figure 9:
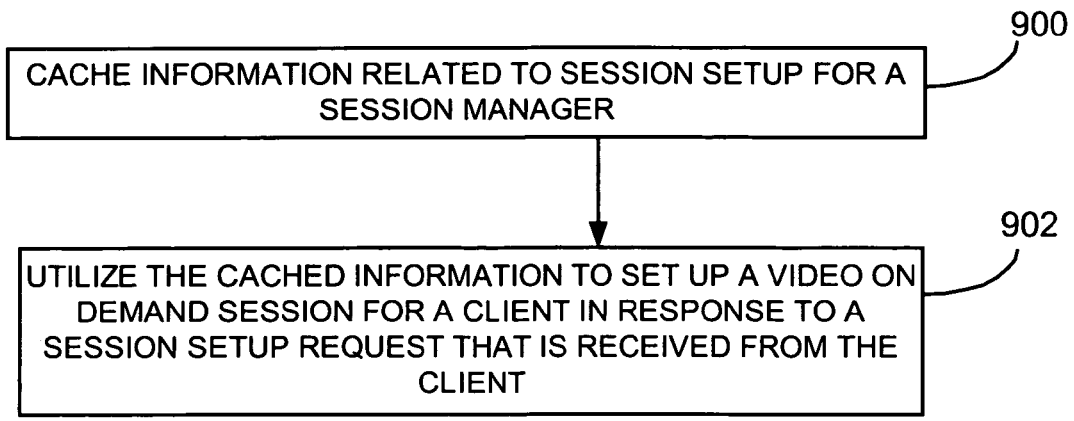
FIG. 9 is a process flow diagram of a method for managing session setup for video on demand sessions, according to another embodiment of the invention.

FIG. 9 is a process flow diagram of a method for managing session setup for video on demand sessions. At block 900, information related to session setup is cached for a session manager. At block 902, the cached information is utilized to setup a video on demand session for a client in response to a session setup request that is received from the client Those skilled in the art will recognize that the invention may be implemented in software, firmware, hardware, or a combination thereof. The above-described embodiments of the invention may also be implemented, for example, by processor-executable instructions. For example, memory 70 (see, FIG. 3) may include processor-executable instructions that may be executed by processor 60 to perform tasks as described with reference to FIGS. 5-8. The instructions may reside in various types of computer readable media. Accordingly, another aspect of the present invention concerns a programmed product, comprising computer readable media tangibly embodying a program of machine readable instructions executable by processor 60 to perform the various techniques and methods in accordance with embodiments of the present invention.

In some embodiments, the computer readable media may comprise, for example, RAM, or a magnetic data storage diskette. The processor-executable instructions may also be stored on a variety of machine readable storage media, such as a DASD storage (e.g., a conventional "hard drive" or a RAID array), magnetic tape, electronic read-only memory, an optical storage device (e.g., CD ROM, WORM, DVD, digital optical tape), paper "punch" cards, or other suitable computer readable media, including transmission media such as digital communication links. In an illustrative embodiment of the invention, the machine-readable instructions may comprise lines of compiled C, C++, or similar language code commonly used by those skilled in the art.]

Although specific embodiments of the invention have been described and illustrated, the invention is not to be limited to the specific forms or arrangements of parts as described and illustrated herein. The invention is limited only by the claims.

What is claimed is:

1. A method for managing session setup for video on demand sessions, the method comprising:

caching information related to session setup in a memory of a session manager at a video server system that supports multiple clients, wherein caching the information related to session setup comprises caching channel to content map information, entitlement information, and resource reservation information, wherein caching the information related to the session setup comprises periodically updating at least one of cached information related to the session setup, wherein periodically updating the at least one of the cached information related to the session setup comprises receiving a digest of an updated at least one of the cached information related to the session setup from at least one remote server, and updating, based on a comparison with the received digest, the at least one of the cached information related to the session setup, and wherein receiving the digest of the updated at least one of the cached information comprises receiving the digest based on one of the following: after expiry of a predefined time period and a predetermined percentage change in the information related to the session setup;

receiving, at the session manager, a session set-up request from a client, wherein the session setup request includes a channel number; and utilizing the channel to content map information, the entitlement information, and the resource reservation information at the session manager to setup a video on demand session for the client in response to the session setup request, wherein the channel to content map information includes associations between channel numbers and content identifiers, wherein the channel number in the session setup request is translated into a content identifier, wherein the resource reservation information is related to reserving network resources for the video on demand session, and wherein the video on demand session is established from a single server that comprises the cached channel to content map information, the entitlement information, and the resource reservation information.

2. The method of claim 1, wherein the content source information, entitlement information, and resource reservation information are cached at the session manager from the at least one remote server.

3. The method of claim 1 wherein the caching comprises utilizing a network messaging protocol to obtain the information that is cached.

4. The method of claim 1 wherein the caching comprises utilizing a network messaging protocol to communicate with a remote server to obtain the information that is cached.

5. The method of claim 1 wherein the caching is executed independently of receiving a session setup request for a video on demand session.

6. The method of claim 1 wherein the video on demand session is associated with broadcast or multicast digital video content that the client receives on one of a plurality of broadcast or multicast channels, wherein each of the plurality of broadcast or multicast channels is identified by a channel number.

7. The method of claim 1, further comprising assigning a session identifier to the reserved network resources for video on demand and returning the session identifier to the client.

8. The method of claim 1, further comprising sending a notification to a resource manager when the video on demand session has ended.

9. The method of claim 8, further comprising re-assigning the reserved resources to a new video on demand session.

10. The method of claim 1, further comprising contacting a resource manager to retain any additional network resources required for the video on demand session.

11. The method of claim 1, further comprising:
comparing, by the session manager, the received updated information with the cached information;
determining whether there is a mismatch between the received updated information and the cached information; and
uploading the received updated information, in response to the determination of the mismatch between the received updated information and the cached information, in the memory of the session manager.

12. The method of claim 1, wherein receiving the digest of the information from the remote server comprises receiving the digest of a subset of a database of the information, wherein the subset of the database is determined based on a client service group of clients previously serviced by the session manager.

13. The method of claim 1, wherein receiving the updated information comprises receiving the updated channel to content map information from a channel to content map database server, the updated entitlement information from an entitlement database server, and the updated resource reservation information from a resource manager server.

14. A system for managing session setup for video on demand sessions, the system comprising:
a video server system having a computer readable media that stores processor readable instructions;
a session manager that supports multiple clients, the session manager comprising: a cache manager configured to cache information related to session setup wherein the cached information related to session setup comprises channel to content map information, entitlement information, and resource reservation information, wherein the session manager is configured to periodically update the cached information related to the session setup based on a digest of updated information related to the session setup received from at least one server, wherein the session manager is further configured to update, based on a comparison with the received digest, the cached information related to the session setup, and wherein receiving the digest of the updated at least one of the cached information comprises receiving the digest based on one of the following: after expiry of a predefined time period, and a predetermined percentage change in the information related to the session setup; and
wherein the session manager is configured to utilize the channel to content map information, the entitlement information, and the resource reservation information to setup a video on demand session for a client in response to a session setup request that is received from the client, wherein the channel to content map information, includes associations between channel numbers and content identifiers, wherein the channel number in the session setup request is translated into a content identifier, wherein the resource reservation information is related to pre-reserving network resources for the video on demand session, and wherein the video on demand session is established from a single server that comprises the channel to content map information, the entitlement information, and the resource reservation information.

15. The system of claim 14 wherein the information is cached at the session manager from a remote server.

16. The system of claim 14 wherein the caching comprises utilizing a network messaging protocol to communicate with a remote server to obtain the information that is cached.

17. The system of claim 14, wherein the cache manager configured to cache the channel to content map information using a cache coherency algorithm.

18. The system of claim 14, wherein the network resources comprises at least one of: network bandwidth, modulation equipment resource, and a digital channel over which the content for the video on demand session is transmitted.

19. A method for providing video content to a client, the method comprising:

caching information comprising content information, entitlement information, and resource reservation information in a memory of a session manager at a video server system that supports multiple clients, wherein caching the information comprises periodically updating the cached content information, the entitlement information, and the resource reservation information, wherein periodically updating the cached information related to the session setup comprises receiving a digest of an updated information related to at least one of the content information, the entitlement information, and the resource reservation information, and updating based on a comparison with the received digest, the at least one of the content information, the entitlement information, and the resource reservation information, and wherein receiving the digest of the updated at least one of the cached information comprises receiving the digest based on one of the following: after expiry of a predefined time period, and a predetermined percentage change in the information related to the session setup;

receiving, at the session manager, a session setup request for the video on demand session, wherein the session setup request includes a channel number associated with the video on demand session, and wherein the session setup request is received directly from a client to the session manager, wherein the channel number of the session setup request is translated into a content identifier, and wherein the resource reservation information is related to pre-reserving network resources for the video on demand session; and establishing the video on demand session with the client using the cached information, wherein the video on demand session is established via a single server comprising the content information, the entitlement information, and the resource reservation information without having to exchange messages with the one or more remote servers.

20. The method of claim 19, wherein periodically updating the cached information comprises periodically updating the cached information independent of the session setup request for the video on demand session.

21. The method of claim 19, wherein periodically updating the cached information comprises uploading a sub-set of a database to the session manager, wherein the sub-set of the database is determined by a client service group comprising clients previously serviced by the session manager, and wherein database is located on a remote server.

22. The method of claim 19, wherein periodically updating the cached at least one of the content information, the entitlement information, and the resource reservation information comprises:
  receiving the digest of database information held by at least one of the remote servers to the session manager;
  via the session manager, comparing the digest of database information received with cached information; and
  if a mismatch exists between the digest of database information and the cached information, uploading database information held by the at least one remote server to the session manager to provide reconstituted cached information.

23. The method of claim 19, wherein caching the resource reservation information comprises caching network resources for establishing video on demand session with the client, wherein the network resources comprises at least one of: network bandwidth, modulation equipment resource, and a digital channel over which the content for the video on demand session is transmitted.

* * * * *